US012287806B2

United States Patent
Maiti et al.

(10) Patent No.: US 12,287,806 B2
(45) Date of Patent: Apr. 29, 2025

(54) OPTIMIZE IN-MEMORY COLUMN STORE FOR MIXED WORKLOADS

(71) Applicant: Oracle International Corporation, Redwood Shores, CA (US)

(72) Inventors: Mahendra Maiti, Fremont, CA (US); Hariharan Lakshmanan, Brisbane, CA (US); Shasank Kisan Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 18/201,378

(22) Filed: May 24, 2023

(65) Prior Publication Data

US 2024/0111753 A1    Apr. 4, 2024

Related U.S. Application Data

(60) Provisional application No. 63/411,795, filed on Sep. 30, 2022.

(51) Int. Cl.

| G06F 16/27 | (2019.01) |
| G06F 11/34 | (2006.01) |
| G06F 12/02 | (2006.01) |
| G06F 16/22 | (2019.01) |
| G06F 16/23 | (2019.01) |

(Continued)

(52) U.S. Cl.
CPC .......... *G06F 16/27* (2019.01); *G06F 11/3414* (2013.01); *G06F 11/3419* (2013.01); *G06F 12/023* (2013.01); *G06F 16/221* (2019.01); *G06F 16/2219* (2019.01); *G06F 16/2365* (2019.01); *G06F 16/2379* (2019.01); *G06F 16/2453* (2019.01); *G06F 16/24552* (2019.01); *G06F 16/24561* (2019.01);
(Continued)

(58) Field of Classification Search
CPC .. G06F 16/27; G06F 11/3414; G06F 11/3419; G06F 12/023; G06F 16/221; G06F 16/2219; G06F 16/2365; G06F 16/2379; G06F 16/2453; G06F 16/24552; G06F 16/24561; G06F 16/24569; G06F 16/258; G06F 16/285; G06F 16/2282; G06F 16/214
See application file for complete search history.

(56) References Cited

U.S. PATENT DOCUMENTS

| 11,972,034 B1* | 4/2024 | Pohlack | ............... G06F 12/0848 |
| 2017/0116232 A1* | 4/2017 | Marwah | ................ G06F 16/217 |

(Continued)

*Primary Examiner* — Kenneth M Lo
*Assistant Examiner* — Jonah C Krieger
(74) *Attorney, Agent, or Firm* — Hickman Becker Bingham Ledesma LLP

(57) ABSTRACT

Techniques are provided for determining an optimal configuration for an in-memory store based on both benefits and overhead that would result from having database elements populated in the in-memory store. The techniques include determining an overhead-adjusted benefit score for each element based, at least in part, on (a) a scan-benefit value, (b) a scan-overhead value, and (c) a DML-overhead value. Based on the plurality of overhead-adjusted benefit scores, the database determines an optimal configuration of the in-memory store, and then evicts in-memory copies of elements and/or loads in-memory copies of elements based on the optimal configuration.

20 Claims, 2 Drawing Sheets

(51) Int. Cl.
    *G06F 16/245*    (2019.01)
    *G06F 16/2453*   (2019.01)
    *G06F 16/2455*   (2019.01)
    *G06F 16/25*     (2019.01)
    *G06F 16/28*     (2019.01)

(52) U.S. Cl.
    CPC ...... *G06F 16/24569* (2019.01); *G06F 16/258* (2019.01); *G06F 16/285* (2019.01)

(56) References Cited

U.S. PATENT DOCUMENTS

2019/0004922 A1\* 1/2019 Browne ................ G06F 11/348
2019/0095346 A1\* 3/2019 Lakshmanan ......... G06F 16/172

\* cited by examiner

OPTIMIZE IN-MEMORY COLUMN STORE FOR MIXED WORKLOADS

CROSS-REFERENCE TO RELATED APPLICATIONS; BENEFIT CLAIM

This application claims the benefit of Provisional Application 63/411,795 filed Sep. 30, 2022, the entire contents of which is hereby incorporated by reference as if fully set forth herein, under 35 U.S.C. § 119(e).

FIELD OF THE INVENTION

The present invention relates to database systems and, more specifically, to techniques for selecting which elements of a database to load into volatile memory.

BACKGROUND

Within a database system, query processing is improved when the data that is targeted by a query has been pre-loaded into volatile memory. Techniques for pre-loading data into volatile memory are described, for example, in U.S. Pat. No. 9,292,564, the entire contents of which is incorporated herein by this reference. A portion of a database is referred to herein as an "element". The copy of an element that is pre-loaded into volatile memory is referred to herein as an in-memory unit (IMU). The portion of volatile memory that is used for storing IMUs is referred to herein as the "in-memory store".

Unfortunately, volatile memory is expensive, so not all elements in the database can be pre-loaded in this manner. Thus, a database system that implements an in-memory store typically has some elements that do have IMUs in the in-memory store (IM elements), and some elements that do not have IMUs in the in-memory store (NIM elements).

When an element is pre-loaded into volatile memory, the data from the element is typically compressed when creating the IMU, thus minimizing the amount of volatile memory the IMU consumes. While compressing the data within IMUs reduces the amount of volatile memory consumed by IMUs, the need to decompress the data that is targeted by a query adds processing overhead.

Further, if a value in a compressed IMU is updated, the overhead associated with decompressing the IMU, making the update, and recompressing the IMU is so great that it is normally not done. Instead, the database server marks the updated portion of the IMU as invalid. Queries that need data that has been invalidated in an IMU must obtain the data elsewhere, such as from some other location in volatile memory or from disk. The greater the number of invalid data items in an IMU, the less efficient it is to use the IMU. Consequently, database servers periodically rebuild IMUs with current values obtained from the corresponding element.

Based on the foregoing, it is clearly important to ensure that the elements that are loaded into the in-memory store are the elements whose pre-loading will provide the greatest performance benefit. U.S. Pat. No. 10,838,933, which is incorporated herein by this reference, describes techniques for periodically choosing which elements of a database to pre-load into an in-memory store based on an element-level heatmap. The number of times an element is accessed by the database generally determines how "hot" an element is. Therefore, having the hottest elements loaded into the in-memory store may achieve the most benefit.

Unfortunately, the most-accessed elements are not always the best elements to pre-load into the in-memory store. In fact, it has been observed that, in some situations, having an otherwise "hot" element loaded into the in-memory store may even result in an overall decrease in database performance. Therefore, there is clearly a need for a more accurate and comprehensive way of selecting which elements of a database to pre-load into the in-memory store.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
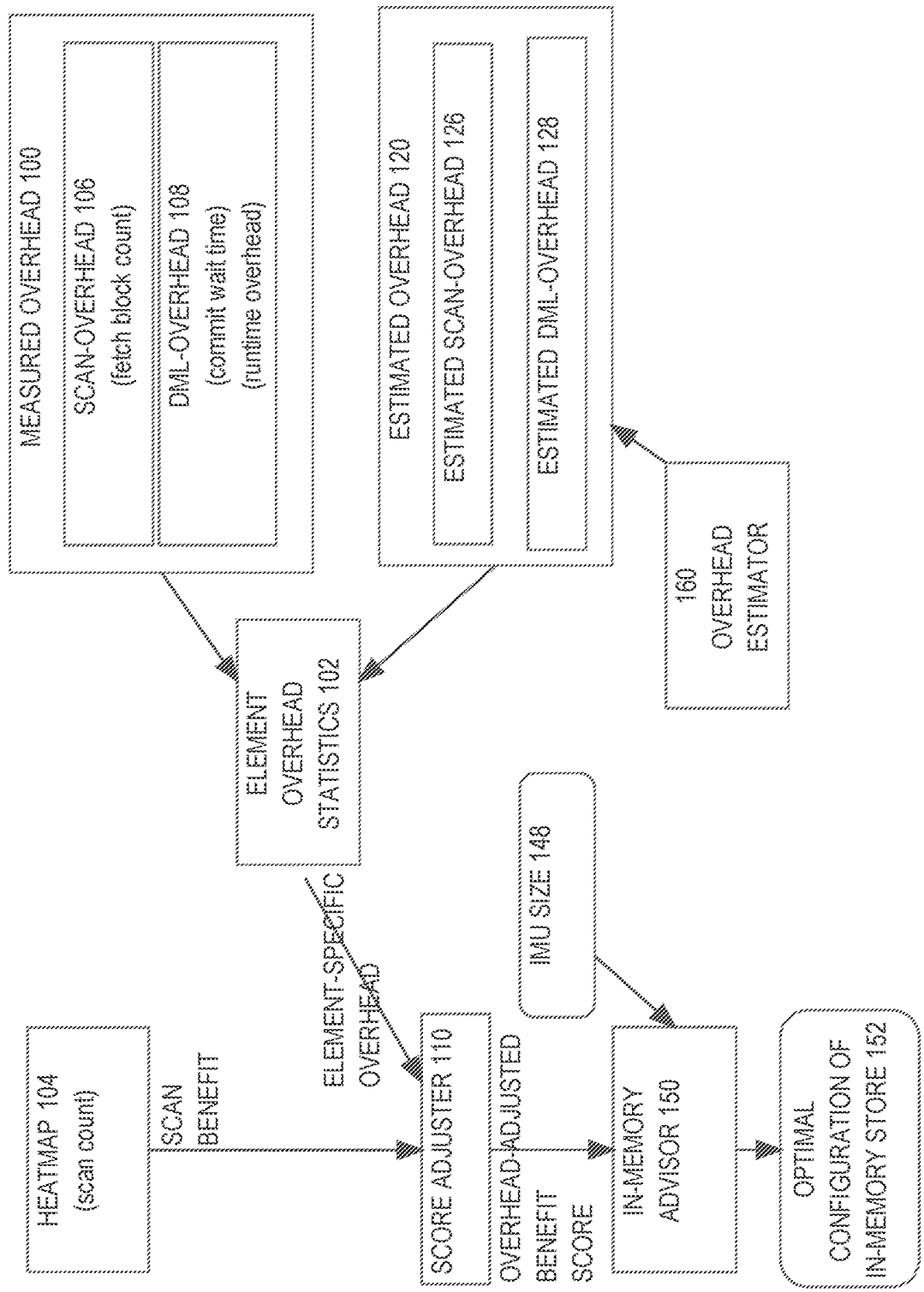
FIG. 1 is a block diagram that illustrates how optimal configuration of an in-memory store may take into account overheads incurred as a result of mixed-workload environments, according to one implementation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As mentioned above, pre-loading elements into the in-memory store primarily based on how "hot" the elements are can lead to situations where the selection of elements for the in-memory store is not optimal. In fact, it has been discovered that database performance may actually decrease by pre-loading some elements into the in-memory store, particularly in "mixed workload environments" in which the elements are not only being read/scanned, but where they are also being updated.

Techniques are described herein where the overhead caused by data manipulation language (DML) commands operating on elements is factored into the decision of which elements to load into the in-memory store. Stated another way, the decision of which elements to load into the in-memory store is based on an overhead-adjusted benefit score where, for each element:

$$\text{overhead\_adjusted\_benefit\_score} = \text{scan\_benefit} - (\text{scan\_overhead} + \text{DML\_overhead})$$

In this formula, scan benefit generally represents the performance benefit that scans of an IM element experience. The scan_overhead generally represents the performance penalties that an in-memory scan of an IM element experiences due to invalidations that were caused by DML operations on the IM element. DML overhead generally represents all overhead that is experienced by DML operations on an IM element due to the fact that the element is in the in-memory store. Each of these factors shall be described in greater detail hereafter.

The overhead adjusted benefit score of each element, along with the estimated IMU size of each element, may be fed into an element-selection algorithm to select the optimal configuration of the in-memory store. Once the optimal configuration is selected:

for IM elements that were not selected, any existing IMUs that correspond to the elements may be evicted from the in-memory store, and for NIM elements that were selected, IMUs may be created and loaded into the in-memory store.

Scan_Benefit

The scan benefit of an element represents the performance benefit that scans of an IM element experience by virtue of the fact that the element is in the in-memory store. The more scans that target an element during a given time period, the greater the scan benefit of having the element in the in-memory store during that time period. Therefore, the scan benefit of each element may be estimated using a heatmap that reflects the scan counts of the element.

Scan_Overhead

As mentioned above, scan_overhead generally refers to the overhead or performance reduction that happens when scans operations encounter invalidated rows in an IMU. As explained above, the data within an IMU is typically compressed. Therefore, rather than update the data in an IMU (which would require decompression, update, and recompression), updated/stale data in the IMU is merely marked as "invalid". Typically, such invalidation is performed at the row level of granularity, but may alternatively be performed at different levels of granularity.

When a requested scan includes data that has been invalidated within the IMU, the IMU must obtain the current version of the invalidated data from some source that is external to the IMU itself. That source may be elsewhere in volatile memory, or may even require accessing the on-disk copy of the data item. During scan operations of an IMU of an element, the higher the number of invalid data items encountered during the scan of the IMU, the greater the scan_overhead.

DML_Overhead

DML_overhead of an element refers to the performance penalties that are experienced by transactions that include DML operations that target an IM element, by virtue of the element being in the in-memory store. The DML_overhead includes both DML_runtime_overhead, which is experienced by transactions as they perform data manipulation language (DML) operations, and DML_commit_overhead, which is experienced when the transactions commit.

DML_Runtime_Overhead

As mentioned above, techniques have been developed to allow data items in the IMU to become invalid, rather than decompress and recompress the IMU with every update. Thus, in database systems that employ such techniques, the DML_runtime_overhead generally does not include the overhead of decompressing and recompressing the IMU. However, the DML_runtime_overhead does include the overhead associated with keeping track of which data items (e.g. rows) within the IMU are updated by the DML operations of each transaction. Such overhead may involve, for example, using a private journal to track changes made to IM elements during a transaction. Tracking such updates is necessary so that the appropriate data items within the IMU may be marked invalid when the transaction that performed the DML operations commits.

DML_Commit_Overhead

The DML_commit_overhead generally reflects the performance reduction that is experienced, at commit time, by transactions that updated the elements that belong to an IM element. For example, the DML_commit_overhead includes the delay incurred by the need to invalidate, at commit time, all data items in the IMU of the IM element that were updated by the committing transaction. Such invalidation may involve, for example, updating an "changed-row bitmap" maintained in a Snapshot Metadata Unit (SMU) that is associated with the IMU of the updated database element.

The DML_commit_overhead may also include moving entries from the private journal of the committing transaction into a global journal. Maintaining such a global journal may be useful, for example, to allow subsequent scans to find the current values of updated rows in the global journal without having to retrieve such values from disk.

Measured Overhead for IM Elements

For IM elements, the scan_overhead and DML_overhead can be directly measured. Specifically, with respect to scan_overhead, while the database server is performing a scan operation on the IMU of an IM element, the database server may maintain a count of how many data items of the element have to be fetched from sources external to the IMU.

Similarly, DML_overhead may be directly measured as the database executes transactions that update data items that belong to an IM element. Specifically, the database server may count how many updates are made to IM elements, and track how much delay is added to the commit time of transactions that have updated such data items due to the need to invalidate the items in the IMU.

Estimated Overhead for NIM Elements

For NIM elements, direct measurements of the scan_overhead and DML_overhead are not possible. Therefore, according to one implementation, the database server includes an overhead estimator 160 that estimates scan_overhead and DML_overhead for such transactions. Specifically, the database server uses a model to generate, for each NIM element:

a scan_overhead estimate: an estimate of the overhead scans of the NIM element would have experience if the NIM element had been an IM element a DML_overhead estimate: an estimate of the overhead (both runtime and commit time) that DML operations on the NIM element would have experienced if the NIM element had been an IM element Estimated Benefits for NIM Elements When a user first enables an in-memory store, the database has no elements in the in-memory store. Thus, initially, all candidate elements are NIM elements. Because a NIM element is not in the in-memory store, the scan count for the element may be zero. For example, because a particular element is not in the in-memory store, the database optimizer may always select a query plan that makes use of an index, rather than an in-memory scan, to access the particular element.

Since the scan count of an element may be used to determine the scan benefit of an element, a zero scan count of a NIM element may cause the in-memory advisor to never include the NIM element as part of the optimal configuration of the in-memory store, even if database performance would significantly improve if the element were loaded in the in-memory store.

To avoid situations where an element that would benefit from being in the in-memory store is never selected for the in-memory store, a "scan benefit estimator" may be used to estimate the benefits that NIM elements would experience if the NIM element were loaded into the in-memory store. Such scan benefit estimates may be used both in the decision of how to initially populate the in-memory store, and in determining overhead-adjusted benefit scores for NIM elements thereafter.

Repopulating Based on Overhead_Adjusted_Benefit_Scores

Once the overhead_adjusted_benefit_score is calculated for each element that is a candidate for pre-loading, the overhead_adjusted_benefit_scores and the size estimates for the IMUs of each element may be fed into an "in-memory advisor". The in-memory advisor implements an element-selection algorithm that determines, based on the overhead_adjusted_benefit_scores and the size estimates, an optimal configuration for the in-memory store. The optimal configuration indicates, given the amount of memory available for the in-memory store, which subset of the candidate elements, if loaded into the in-memory store, would provide the most benefit.

Any suitable automated selection algorithm may be used, such as the algorithms disclosed in U.S. Pat. No. 10,838,933, which has been incorporated herein. Once the optimal configuration of the in-memory store has been determined, elements are loaded or evicted as needed to achieve the optimal configuration. However, in some implementations, elements whose overhead_adjusted_benefit_scores are zero or negative (negative-benefit elements) may receive special treatment, as described in greater detail hereafter.

In-Memory Store Configuration Determination

FIG. 1 is a block diagram that illustrates a technique for determining an optimal configuration for an in-memory store that takes into account overhead experienced by scans and DML operations. Referring to FIG. 1, during a given time period, the database server collects statistics for each element that is a candidate for the in-memory store. Specifically, in the illustrated implementation, the database server uses a heatmap 104 to keep track of how "hot" each candidate element is. The hotness of an element may be measured, for example, by the count of scans that target the element during the time period.

For IM elements, the database server generates measured overhead 100 statistics. The measured overhead 100 includes both scan_overhead 106, and DML_overhead 108. The scan_overhead may be a count of the number of block fetches that the database server must perform because invalidated items were encountered during scans of the IMU of the element. The DML_overhead may include both the runtime overhead that is incurred while processing a DML statement due to the fact that the element that is targeted by the DML statement is an IM element, and the commit wait time experienced while invalidating the portions of an IMU that correspond to updates made by DML statements.

As mentioned above, for NIM elements, some overhead statistics must be estimated by an overhead estimator 160 rather than measured. In one implementation, overhead estimator 160 generates estimated overhead 120 statistics that include, for each NIM element, an estimated scan_overhead 126 and an estimated transaction overhead 128.

The various overhead statistics for each element may be maintained by the database server as element overhead statistics 102. Element overhead statistics 102 may be stored, for example, in a hash table.

In the illustrated implementation, a score adjuster 110 within the database server combines, for each candidate database element:
  the element-specific-overhead indicated by the element overhead statistics 102, and
  the scan benefit indicated by heatmap 104

By combining these values, the database server produces an element-specific overhead-adjusted benefit score. For example, score adjuster 110 may generate overhead-adjusted benefit score for an element by subtracting the element-specific overhead score of the element from the scan benefit score of the element.

The overhead-adjusted benefit scores, along with the size of the IMUs that would be required for each element, are fed into an in-memory advisor 150 that implements an element-selection algorithm. Based on the overhead-adjusted benefit scores and the IMU sizes, the in-memory advisor 150 determines an optimal configuration 152 of the in-memory store. After the optimal configuration 152 is determined, the database server may evict IMUs and load new IMUs as needed to achieve the optimal configuration 152.

Decision Time Periods and Optimization Time Windows

The overhead penalties discussed herein are a result of a mixed workload. However, the workload experienced within a database system is constantly changing. Consequently, a configuration of the in-memory store that is determined to be "optimal" for one time period may be suboptimal for other time periods. For example, a particular table may have a very low DML-related-overhead value for one time period, and a very high DML-related-overhead value for a different period.

Therefore, according to one implementation, the database server includes a background process that periodically recalculates the overhead-adjusted benefit scores of the candidate elements, and redetermines the optimal configuration of the in-memory store. The amount of time that lapses between optimal configuration determinations is referred to herein as the "decision time period". The decision time period may be, for example, two minutes. In a database system that employs a two-minute decision time period, the database server recalculates overhead-adjusted benefit scores and determines the optimal configuration of the in-memory store every two minutes.

Unfortunately, if the optimal configuration is recalculated frequently based on only what occurred during the most recent decision time period, the optimal configuration of the in-memory store may change drastically from one decision time period to the next. Therefore, according to one implementation, rather than determining an optimal configuration of the in-memory store based on only the workload statistics measured/estimated during the most recent decision time period, the database server takes into account the workload statistics that were measured/estimated for a much larger time window, referred to herein as the "optimization time window". For example, in a database system in which the decision time period is two minutes, the optimization time window may be 24 hours. By taking account workload statistics over a longer period of time, the database system avoids the inefficiency that would occur if the configuration of the in-memory store were constantly undergoing drastic changes.

Weighting Measured Overhead and Estimated Overhead

For elements that are in the in-memory store during an entire optimization time window, the measured overhead 100 is used to determine the overhead_adjusted_benefit_score for the elements. Similarly, for elements that are not in the in-memory store during an entire optimization time window, the estimated overhead 120 is used to determine the overhead_adjusted_benefit_score for the elements. However, as the workload changes over time, so do the overhead_adjusted_benefit_scores of the various elements. Consequently, there may be many elements that were in the in-memory store during some portions of an optimization time window, and not in the in-memory store during other portions of the same optimization time window.

According to one implementation, a weighted overhead score is generated for each element based on both the measured overhead 100 of the element and the estimated overhead 120 of the element. Specifically, in one implementation, the database server tracks how much time, during an optimization time window, each element was in-memory, and applies weights to the overhead values accordingly. For example, an element that was in-memory for 50% of a reevaluation time window may have its weighted overhead determined as: 0.5(measured overhead)+0.5(estimated overhead). On the other hand, an element that was in-memory for 70% of a optimization time window may have its weighted overhead determined as 0.7(measured overhead)+0.3(estimated overhead).

Negative-Score Elements

Because the techniques described herein take into account the overhead that may be experienced by IM elements in mixed-workload environments, it is possible for the overhead_adjusted_benefit_score of an element to be zero or negative. Such negative-score elements (which may include zero-benefit elements) are elements that would result in either no benefit, or a net decrease of performance, if loaded into the in-memory store. To avoid reducing the performance of the system, negative-score elements may be treated differently to ensure that they are not loaded into the in-memory store, even if there is enough available memory in the in-memory store to do so.

According to one embodiment, the IMUS of negative-score elements are automatically evicted from the in-memory store regardless of whether the volatile memory occupied thereby is needed to load another IMU. That is, even if enough volatile memory has been allocated to the in-memory store to allow a negative-score element to be selected by the in-memory advisor 150, the negative-score element is evicted from the in-memory store and is not considered a candidate for the in-memory score as long as the overhead_adjusted_benefit_score of the element remains negative. Any requests to populate such elements are ignored. Once the overhead_adjusted_benefit_score of such an element becomes positive again, the element ceases to be marked as a negative-score element and is once again treated as a candidate for the in-memory store.

As mentioned above, a negative-score element may cease to be considered a candidate for re-population until the overhead_adjusted_benefit_score of the element becomes positive. In an alternative implementation, after a negative-score element has been evicted, the element may cease to be considered a candidate for repopulation for a particular time-out period. After that time period lapses, the database server may then treat the element as a candidate, allowing the element to be selected for repopulation (even with a negative overhead_adjusted_benefit_score) if there is sufficient memory to do so.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of the entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the user defined function and by specifying a reference to a file containing the source code of the Java class (i.e. ava file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data type and to be processed by a DBMS in database statements. In general, database software of a DBMS is programmed to recognize and process native data types without configuring the DBMS to do so, by for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
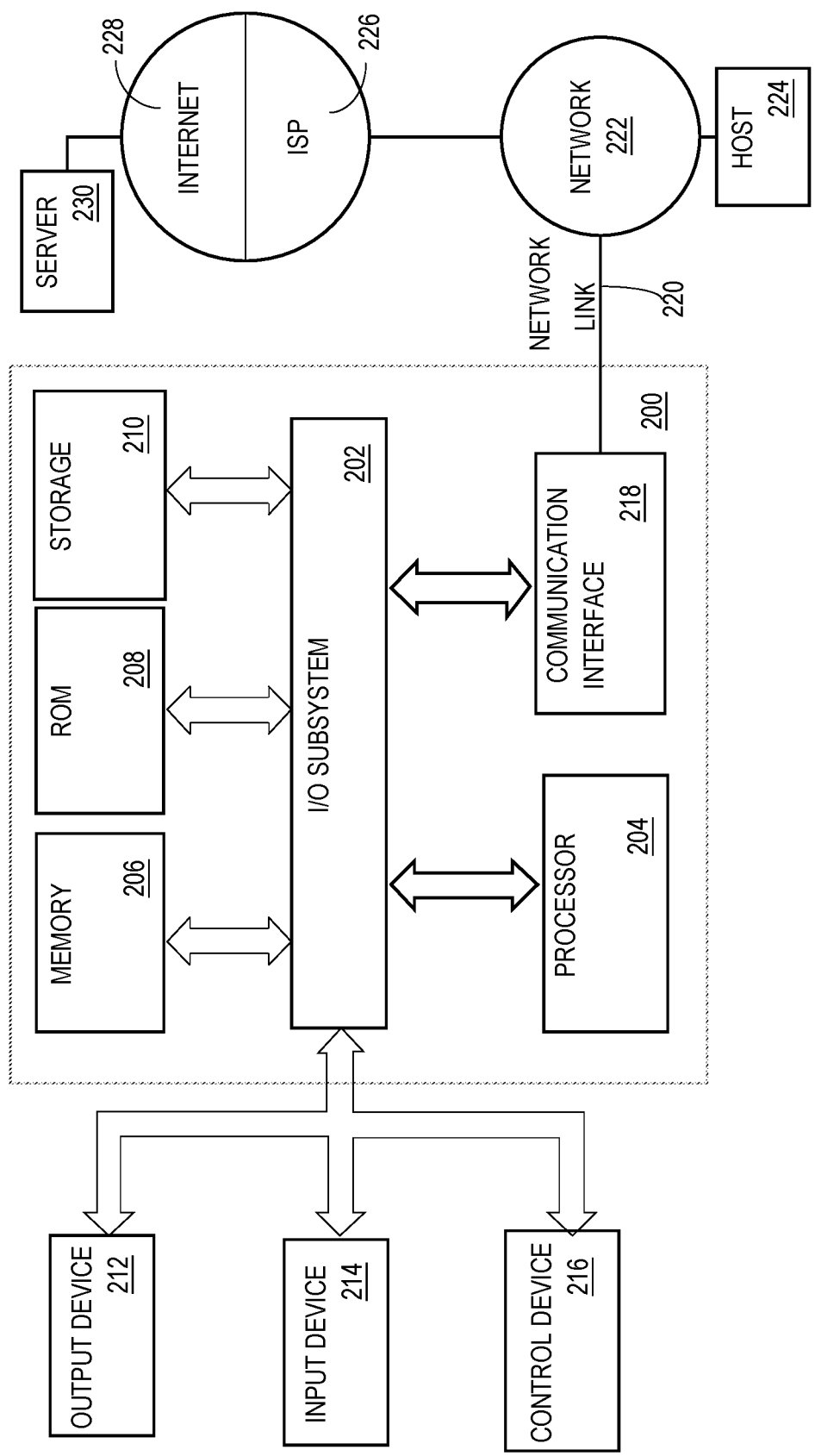
FIG. 2 is a block diagram of a computer system upon which the techniques described herein may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating, by a database server, a plurality of overhead-adjusted benefit scores;
   wherein each overhead-adjusted benefit score is for a corresponding database element of a plurality of database elements that are in-memory candidates for a database system;
   wherein generating the plurality of overhead-adjusted benefit scores comprises, for each database element of the plurality of database elements, the database server determining an overhead-adjusted benefit score based, at least in part, on measured and/or estimated reads and writes to the database element;
   wherein generating the plurality of overhead-adjusted Benefit scores is performed at the end of an optimization time window;
   wherein for database elements for which there was a copy in an in-memory store of the database system during the entire optimization time window, the overhead-adjusted benefit scores are based on statistics derived from measurements obtained during the optimization time window;
   wherein for database elements for which there was no copy in the in-memory store during any of the optimization time window, the overhead-adjusted benefit scores are based on statistics that are estimated by an overhead estimator;
   based on the plurality of overhead-adjusted benefit scores, determining an optimal configuration of the in-memory store; and
   by the database server, evicting in-memory copies of elements and/or loading in-memory copies of elements based on the optimal configuration;
   wherein the method is performed by one or more computing devices.

2. The method of claim 1 wherein determining the overhead-adjusted benefit score based on measured and/or estimated reads and writes to the database element comprises determining the overhead-adjusted benefit score for each database element based, at least in part, on:
   a scan-benefit value that represents an amount of performance benefit expected to be experienced, by scan operations that target the database element, as a result of having an in-memory copy of the database element in the in-memory store of the database system;
   a scan-overhead value that represents an amount of overhead expected to be experienced, by scan operations that target the database element, as a result of having invalidated data items in the in-memory copy of the database element; and
   a DML-overhead value that represents an amount of overhead expected to be experienced, by transactions that perform Data Manipulation Language (DML) operations that target the database element, as a result of having the in-memory copy of the database element in the in-memory store.

3. The method of claim 2 further comprising determining the DML-overhead value for a database element based at least in part on:
   a DML-runtime-overhead value that reflects overhead expected to be experienced, when performing DML operations that target the database element, as a result of having the in-memory copy of the database element in the in-memory store; and
   a DML-commit-overhead value that reflects overhead expected to be experienced, when committing transactions that performed DML operations that target the database element, as a result of having the in-memory copy of the database element in the in-memory store.

4. The method of claim 1 wherein, for database elements for which there was a copy in the in-memory store during a fraction of the optimization time window, the overhead-adjusted benefit scores are generated based on both:
   statistics derived from measurements obtained during the optimization time window; and
   statistics that are estimated by the overhead estimator.

5. The method of claim 4 wherein, for database elements for which there was a copy in the in-memory store during a fraction of the optimization time window, relative weights are applied, to the statistics derived from measurements and the statistics that are estimated, based on the fraction.

6. The method of claim 1 wherein generating the plurality of overhead-adjusted benefit scores is repeatedly performed after each of a plurality of decision time periods, wherein each decision time period is shorter than the optimization time window.

7. The method of claim 2 wherein:
   generating the plurality of overhead-adjusted benefit scores includes generating, for a particular element, a negative overhead-adjusted benefit score; and evicting in-memory copies of elements includes evicting an in-memory copy of the particular element without regard to whether the in-memory store has sufficient space for the in-memory copy of the particular element.

8. The method of claim 7 further comprising preventing the particular element from being an in-memory candidate until a positive overhead-adjusted benefit score is generated for the particular element.

9. The method of claim 2 further comprising generating the DML-overhead value for a database element based, at least in part, on commit-time delays experienced, by transactions that perform DML operations that target the database element, as a result of having to invalidate data items in the in-memory copy of the database element.

10. The method of claim 2 further comprising generating the DML-overhead value for a database element based, at least in part, on delays experienced, during performance of DML operations that target the database element, as a result of having the in-memory copy of the database element in the in-memory store.

11. One or more non-transitory computer-readable media storing instructions which, when executed by one or more computing devices, cause:
   generating, by a database server, a plurality of overhead-adjusted benefit scores;
   wherein each overhead-adjusted benefit score is for a corresponding database element of a plurality of database elements that are in-memory candidates for a database system;
   wherein generating the plurality of overhead-adjusted benefit scores comprises, for each database element of the plurality of database elements, the database server determining an overhead-adjusted benefit score based, at least in part, on measured and/or estimated reads and writes to the database element;
   wherein generating the plurality of overhead-adjusted Benefit scores is performed at the end of an optimization time window;
   wherein for database elements for which there was a copy in an in-memory store of the database system during the entire optimization time window, the overhead-adjusted benefit scores are based on statistics derived from measurements obtained during the optimization time window;
   wherein for database elements for which there was no copy in the in-memory store during any of the optimization time window, the overhead-adjusted benefit scores are based on statistics that are estimated by an overhead estimator;
   based on the plurality of overhead-adjusted benefit scores, determining an optimal configuration of the in-memory store; and
   by the database server, evicting in-memory copies of elements and/or loading in-memory copies of elements based on the optimal configuration.

12. The one or more non-transitory computer-readable media of claim 11 wherein determining the overhead-adjusted benefit score based on measured and/or estimated reads and writes to the database element comprises determining the overhead-adjusted benefit score for each database element based, at least in part, on:
   a scan-benefit value that represents an amount of performance benefit expected to be experienced, by scan operations that target the database element, as a result of having an in-memory copy of the database element in the in-memory store of the database system;
   a scan-overhead value that represents an amount of overhead expected to be experienced, by scan operations that target the database element, as a result of having invalidated data items in the in-memory copy of the database element; and
   a DML-overhead value that represents an amount of overhead expected to be experienced, by transactions that perform Data Manipulation Language (DML) operations that target the database element, as a result of having the in-memory copy of the database element in the in-memory store.

13. The one or more non-transitory computer-readable media of claim 12 further comprising instructions for determining the DML-overhead value for a database element based at least in part on:
   a DML-runtime-overhead value that reflects overhead expected to be experienced, when performing DML operations that target the database element, as a result of having the in-memory copy of the database element in the in-memory store; and
   a DML-commit-overhead value that reflects overhead expected to be experienced, when committing transactions that performed DML operations that target the database element, as a result of having the in-memory copy of the database element in the in-memory store.

14. The one or more non-transitory computer-readable media of claim 11 wherein, for database elements for which there was a copy in the in-memory store during a fraction of the optimization time window, the overhead-adjusted benefit scores are generated based on both:
   statistics derived from measurements obtained during the optimization time window; and
   statistics that are estimated by the overhead estimator.

15. The one or more non-transitory computer-readable media of claim 14 wherein, for database elements for which there was a copy in the in-memory store during a fraction of the optimization time window, relative weights are applied, to the statistics derived from measurements and the statistics that are estimated, based on the fraction.

16. The one or more non-transitory computer-readable media of claim 11 wherein generating the plurality of overhead-adjusted benefit scores is repeatedly performed after each of a plurality of decision time periods, wherein each decision time period is shorter than the optimization time window.

17. The one or more non-transitory computer-readable media of claim 12 wherein:
   generating the plurality of overhead-adjusted benefit scores includes generating, for a particular element, a negative overhead-adjusted benefit score; and
   evicting in-memory copies of elements includes evicting an in-memory copy of the particular element without regard to whether the in-memory store has sufficient space for the in-memory copy of the particular element.

18. The one or more non-transitory computer-readable media of claim 17 further comprising instructions for preventing the particular element from being an in-memory candidate until a positive overhead-adjusted benefit score is generated for the particular element.

19. The one or more non-transitory computer-readable media of claim 12 further comprising instructions for generating the DML-overhead value for a database element based, at least in part, on commit-time delays experienced, by transactions that perform DML operations that target the database element, as a result of having to invalidate data items in the in-memory copy of the database element.

20. The one or more non-transitory computer-readable media of claim 12 further comprising instructions for generating the DML-overhead value for a database element based, at least in part, on delays experienced, during performance of DML operations that target the database element, as a result of having the in-memory copy of the database element in the in-memory store.

* * * * *

UNITED STATES PATENT AND TRADEMARK OFFICE
CERTIFICATE OF CORRECTION

PATENT NO. : 12,287,806 B2  
APPLICATION NO. : 18/201378  
DATED : April 29, 2025  
INVENTOR(S) : Maiti et al.

Page 1 of 1

It is certified that error appears in the above-identified patent and that said Letters Patent is hereby corrected as shown below:

In the Specification

In Column 2, Line 56, delete "scan benefit" and insert -- scan_benefit --, therefor.

In Column 2, Line 61, delete "DML overhead" and insert -- DML_overhead --, therefor.

In Column 2, Line 66, delete "overhead adjusted benefit score" and insert -- overhead_adjusted_benefit_score --, therefor.

In Column 3, Line 10, delete "scan benefit" and insert -- scan_benefit --, therefor.

In Column 3, Line 14, delete "scan benefit" and insert -- scan_benefit --, therefor.

In Column 3, Lines 15-16, delete "scan benefit" and insert -- scan_benefit --, therefor.

In Column 4, Line 38, delete "scan_overhead estimate:" and insert -- scan_overhead_estimate: --, therefor.

In Column 4, Line 41, delete "DML_overhead estimate:" and insert -- DML_overhead_estimate: --, therefor.

In Column 7, Line 28, delete "IMUS" and insert -- IMUs --, therefor.

In Column 8, Line 30, delete "(MondoDB™" and insert -- (MongoDB™ --, therefor.

In the Claims

In Column 13, Line 58, in Claim 1, delete "Benefit" and insert -- benefit --, therefor.

In Column 15, Line 38, in Claim 11, delete "Benefit" and insert -- benefit --, therefor.

Signed and Sealed this  
Twenty-second Day of July, 2025

Coke Morgan Stewart  
*Acting Director of the United States Patent and Trademark Office*